United States Patent
Lynch et al.

(10) Patent No.: US 10,365,642 B2
(45) Date of Patent: Jul. 30, 2019

(54) PROBE OF ALARM FUNCTIONALITY USING COMMUNICATION DEVICES

(71) Applicant: Avaya Inc., Basking Ridge, NJ (US)

(72) Inventors: John Lynch, Belleville (CA); Chris McArthur, Belleville (CA); Mark Fletcher, Ringwood, NJ (US); Tracy Monk, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/284,169

(22) Filed: Oct. 3, 2016

(65) Prior Publication Data

US 2018/0096589 A1  Apr. 5, 2018

(51) Int. Cl.
  *G05B 23/00* (2006.01)
  *G08B 1/08* (2006.01)
  *G08B 29/12* (2006.01)
(52) U.S. Cl.
  CPC ............... *G05B 23/00* (2013.01); *G08B 1/08* (2013.01); *G08B 29/12* (2013.01)

(58) Field of Classification Search
  CPC .................. G08B 29/02; G08B 25/008; G08B 13/19645; G08B 17/00; G08B 23/00; G08B 29/14; G08B 7/062
  See application file for complete search history.

(56) References Cited

U.S. PATENT DOCUMENTS

2013/0342332 A1* 12/2013 Grossman ............... B60R 25/04
  340/426.11

* cited by examiner

*Primary Examiner* — Kabir A Timory (57) ABSTRACT

Embodiments disclosed herein provide systems, methods, and computer readable media for probing alarm functionality at a premises. In a particular embodiment, a method provides, in response to activation of an audible alarm, obtaining audio information captured by a first communication device of a plurality of communication devices positioned throughout the premises. The method further provides determining whether the audio information indicates that the alarm is functioning properly and determining a first position of the premises where the first communication device is located. When the audio information indicates that the alarm is not functioning properly, the method provides indicating that the alarm is not functioning properly at the first position.

20 Claims, 6 Drawing Sheets

PROBE OF ALARM FUNCTIONALITY USING COMMUNICATION DEVICES

TECHNICAL FIELD

Aspects of the disclosure are related to premises alarm systems and, in particular, to using existing communication devices to audit whether an alarm system is functioning properly.

TECHNICAL BACKGROUND

Audible alarms indicating conditions, such as fire, have long existed to inform people about those conditions. Especially in larger premises, such as a large office building, many sound producing elements are used to ensure an alarm can be heard by people throughout the premises. While such alarms can be tested by triggering the alarm and having a person physically listen for the alarm at various positions around the premises, this testing does not guarantee that the alarm is properly sounding at the various positions during an actual alarm situation. Moreover, such testing still requires manpower to ensure every desired position throughout the premises is covered by the alarm sound.

OVERVIEW

Embodiments disclosed herein provide systems, methods, and computer readable media for probing alarm functionality at a premises. In a particular embodiment, a method provides, in response to activation of an audible alarm, obtaining audio information captured by a first communication device of a plurality of communication devices positioned throughout the premises. The method further provides determining whether the audio information indicates that the alarm is functioning properly and determining a first position of the premises where the first communication device is located. When the audio information indicates that the alarm is not functioning properly, the method provides indicating that the alarm is not functioning properly at the first position.

In some embodiments, in response to the activation of the audible alarm, the method provides obtaining audio information from each of the plurality of communication devices, determining whether the audio information from each of the plurality of communication devices indicates that the alarm is functioning properly. For devices of the plurality of communication devices with audio information that indicates that the alarm is not functioning properly, the method determining respective positions of the premises where the devices are located and indicating that the alarm is not functioning properly at the positions.

In some embodiments, obtaining the audio information comprises receiving an indication that the audible alarm has been triggered from an alarm system and instructing the plurality of communication devices to activate an alarm monitor application to capture the audio information.

In some embodiments, the first communication device comprises a mobile communication device and the method further provides determining whether the first position changes to identify whether the first communication device is moving.

In some embodiments, when the first communication device is not moving, the method includes providing a user notification that people may be having problems at the first location.

In some embodiments, determining whether the audio information indicates that the alarm is functioning properly comprises comparing the audio information to an audio fingerprint of the audible alarm. In those fingerprints, the alarm is functioning properly when the audio information corresponds with the audio fingerprint.

In some embodiments, the method further provides determining whether at least a portion of the audio information corresponds to an audio fingerprint for a type of event and indicating that the type of event is occurring when the audio information corresponds to the audio fingerprint.

In some embodiments, indicating that the alarm is not functioning properly at the first position comprises providing a notification to a user indicating that the alarm is not functioning properly at the first position.

In some embodiments, determining the first position comprises determining a network location of the first communication device and identifying a position of the premises corresponding to the network location as the first position.

In some embodiments, indicating that the alarm is not functioning properly at the first position occurs after a predetermined period of time.

In another embodiment, an alarm audit system is provided having one or more computer readable storage media and a processing system operatively coupled with the one or more computer readable storage media. Program instructions stored on the one or more computer readable storage media, when read and executed by the processing system, direct the processing system to, in response to activation of an audible alarm, obtain audio information captured by a first communication device of a plurality of communication devices positioned throughout the premises. The program instructions further direct the processing system to determine whether the audio information indicates that the alarm is functioning properly and determine a first position of the premises where the first communication device is located. When the audio information indicates that the alarm is not functioning properly, the program instructions direct the processing system to indicate that the alarm is not functioning properly at the first position.

In yet another embodiment, a communication device is provided having one or more computer readable storage media and a processing system operatively coupled with the one or more computer readable storage media. Program instructions stored on the one or more computer readable storage media, when read and executed by the processing system, direct the processing system to, in response to activation of an audible alarm, capture audio information and determine whether the audio information indicates that the alarm is functioning properly. The program instructions further direct the processing system to determine a first position of the premises where the communication device is located and, when the audio information indicates that the alarm is not functioning properly, indicate that the alarm is not functioning properly at the first position.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The embodiments described below leverage communication devices that are located throughout a premises to probe the premises for alarm functionality. Specifically, depending on the type of premises (e.g. office building, school, stage venue, etc.), different types of communication devices may already be positioned at various positions throughout the premises for purposes other than probing alarm functionality. The communication devices may be anything from wired phones, mobile phones, tablet computers, personal computers, or some other type of device capable of capturing audio. It is the audio capture and communication capability of these devices that is leveraged to determine whether an alarm is properly sounding at the devices position in the premises.

Figure 1:
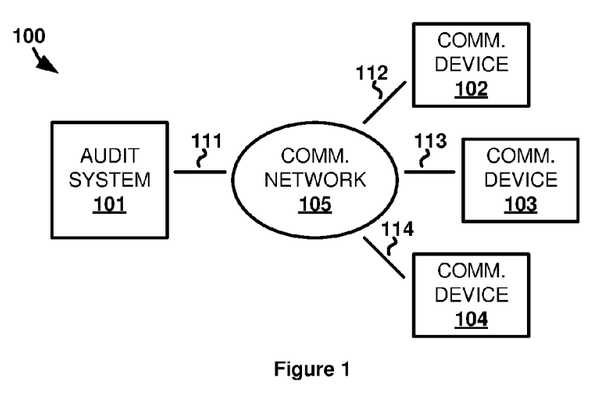
FIG. 1 illustrates an alarm environment for probing alarm functionality at a premises.

FIG. 1 illustrates alarm environment 100 for probing alarm functionality at a premises. Alarm environment 100 includes alarm audit system 101, communication device 102, communication device 103, communication device 104, and communication network 105. Alarm audit system 101 and communication network 105 communicate over communication link 111. Communication devices 102-104 and communication network 105 communicate over communication links 112-114, respectively.

In operation, alarm audit system 101 is configured to use communication device 102, communication device 103, and communication device 104 to determine whether an alarm is functioning at a premises where the devices are located by using the devices to "listen" for the alarm sound by capturing and analyzing audio information. Alarm audit system 101 may also be located at the premises or may be communicating with the devices from elsewhere over the Internet or otherwise. Communication devices 102-104 may all be the same type of device or may be different types of devices. The manner in which alarm audit system 101 communicates with communication devices 102-104 to capture and analyze audio information may depend on the device type. For example, if communication device 102 is a desk phone, then alarm audit system 101 may have the ability to open an audio channel with communication device 102 (i.e. one typically used for voice communications with a user of communication device 102). In another example, if communication device 102 is a mobile phone, then alarm audit system 101 may not be able to remotely open a typical audio channel with communication device 102 and, instead, an application executing on communication device 102 is invoked. Other methods of triggering a communication device to capture audio information may also be used.

Figure 2:
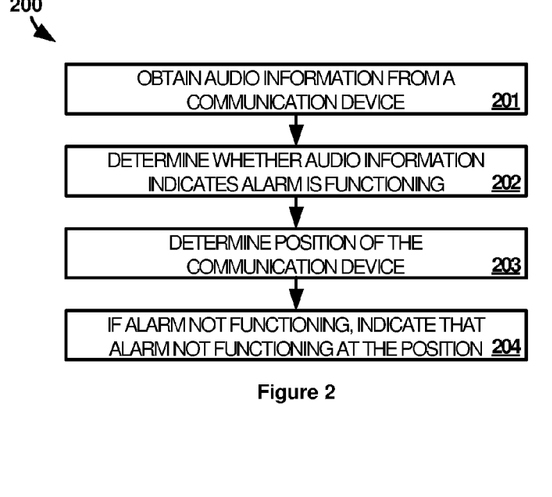
FIG. 2 illustrates a method of operating in the alarm environment to probe alarm functionality at a premises.

FIG. 2 illustrates method 200 of operating in the alarm environment to probe alarm functionality at a premises. Method 200 provides, in response to activation of an audible alarm, obtaining audio information captured by one of communication devices 102-104 (communication device 102 will be used for this example) positioned throughout the premises (201). Depending on which element is performing method 200, obtaining the audio information may comprise alarm audit system 101 receiving the audio information from communication device 102 or may be communication device 102 capturing the audio information through a microphone or some other type of audio capture element.

In one example, alarm audit system 101 may receive a notification from an alarm system that sounds the alarm indicating that the audible alarm has been activated. In another example, a user may provide input to alarm audit system 101 indicating that the alarm has been activated. In yet another example, alarm audit system 101 may be incorporated into the alarm system and will therefore implicitly know when an alarm has been activated. Other manners of indicating to alarm audit system 101 that an alarm has been activated may also be used.

Method 200 then provides determining whether the audio information indicates that the alarm is functioning properly (202). The determination may be made by communication device 102 or may be made by alarm audit system 101 after receiving the audio information from communication device 102. The determination may be made by comparing at least a portion of the audio information to a known sound of the alarm to identify whether the audio information includes the sound made by the alarm. For example, the alarm may sound at a certain frequency or have a certain pattern (e.g. pulse or tone progression) that is known to either alarm audit system 101 or communication device 102 depending on which element is making the determination. In some examples, the known alarm sound may comprise a reference fingerprint generated from that alarm sound. A fingerprint may therefore be generated from the audio information and compared to the reference fingerprint to determine whether there is a match (i.e. the alarm sound is included in the audio information).

Method 200 further provides determining a position of the premises where communication device 102 is located (203). Various methods may be used by alarm audit system 101, communication device 102, or some combination thereof to determine the position of communication device 102. The method may use an existing database(s) (either within alarm audit system 101 or in another system) that include information about the position of various communication devices, layer 2/3 switches (Link Layer Discovery Protocol), IP Subnetting in a management local area network (LAN), WiFi, Global Positioning System, triangulation through radio or light sources, or some other means for location determination—including combinations thereof. For example, if communication device 102 is not a mobile device, the position may be determined based on a preset position of communication device 102. For example, either alarm audit system 101 or communication device 102 itself may have access to a database that lists communication device 102 at a particular position in the premises (e.g. within a certain room). In alternative examples, communication device 102 may be mobile, such as a mobile phone or tablet, and GPS, triangulation, WiFi accesses point location, or some other means may be used to determine communication device 102's current position at the premises.

When the audio information indicates that the alarm is not functioning properly, method 200 provides indicating that the alarm is not functioning properly at communication device 102's position (204). As noted above, it may be determined that the alarm is not functioning properly if the audio information is determined to not include the sound that the audible alarm produces. If communication device 102 itself determines that the alarm is not functioning properly, then indicating that fact comprises communication device 102 transferring a notification to alarm audit system 101 indicating that the alarm is not functioning properly.

In some examples, step 203 discussed above for determining communication device 102's position may only occur once the audio information indicates that the alarm is not functioning properly at step 204. As such, resources to determine the position may only be needed when a communication device is not capturing the audible alarm sound in the audio information. In other examples, the position of communication device 102 may be used to determine whether communication device 102 is located at the premises. For instance, if communication device 102 is a mobile phone, there is a possibility that communication device 102 is not located at the premises during the audible alarm. In those cases, the lack of audio information having the alarm sound would not indicate that the alarm is not functioning properly. Additionally, in some cases, a predefined period of time may be allowed to elapse before it is determined that the audible alarm is not functioning properly. In those cases, the audio information may continue to be captured in hopes that the alarm sound will be picked up by the capturing communication device. For example, a communication device may not initially be positioned such that its microphone can sufficiently capture the audible alarm sound and waiting a period of time, which may allow the device to reposition, may allow the communication device to pick up the alarm sound.

While method 200 is described with respect to communication device 102 of communication devices 102-104, the method would preferably be performed with respect to all of communication devices 102-104. In that manner, alarm audit system 101 is able to determine whether the audible alarm is functioning properly at the position of each of communication devices 102-104. It should be understood that, while only three communication devices are shown in alarm environment 100, any number of communication devices may be involved with more devices generally allowing for more positions throughout the premises to be covered.

Once alarm audit system 101 has determined that the audible alarm is not functioning properly at certain positions of the premises, alarm audit system 101 may provide a user notification indicating those positions. The user notification may be through a user interface of alarm audit system 101 or through the user interface of another system in communication with alarm audit system 101. In some examples, the notification may include a message (e.g. email, text, or otherwise) transferred to a communication device of a user, such as an alarm system administrator or an emergency service provider. Similarly, a notification may be sent to the communication device(s) of communication devices 102-104 that captured the audio information that indicated that the audible alarm was not functioning properly. Any users at those devices could therefore be notified of the alarm despite the malfunctioning alarm at that position of the premises.

Referring back to FIG. 1, alarm audit system 101 comprises a computer processor system and communication interface. Alarm audit system 101 may also include other components such as a router, server, data storage system, and power supply. Alarm audit system 101 may reside in a single device or may be distributed across multiple devices. Alarm audit system 101 may be an application server, alarm system, personal computer workstation, mobile computing device, network gateway system, or some other computing system—including combinations thereof.

Communication devices 102-104 each comprise a computer processor system, an audio capture element, and a communication interface. Communication devices 102-104 may also include other components such as a user interface, router, server, data storage system, and power supply. Communication devices 102-104 may each reside in a single device or may be distributed across multiple devices. Communication devices 102-104 may be a telephone, computer, tablet, communication server, e-book, mobile Internet appliance, network interface card, media player, game console, application server, proxy server, or some other communication apparatus—including combinations thereof.

Communication network 105 comprises network elements that provide communications services to at least alarm audit system 101 and communication devices 102-104. Communication network 105 may comprise switches, wireless access nodes, Internet routers, network gateways, application servers, computer systems, communication links, or some other type of communication equipment—including combinations thereof. Communication network 105 may be a single network, such as a local area network, a wide area network, or the Internet, or may be a combination of multiple networks.

Communication links 111-114 use metal, glass, air, space, or some other material as the transport media. Communication links 111-114 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), Building Automation and Control Networks (BACnet), Session Initiation Protocol (SIP), or some other communication format—including combinations thereof. Communication links 111-114 could be direct links or may include intermediate networks, systems, or devices.

Figure 3:
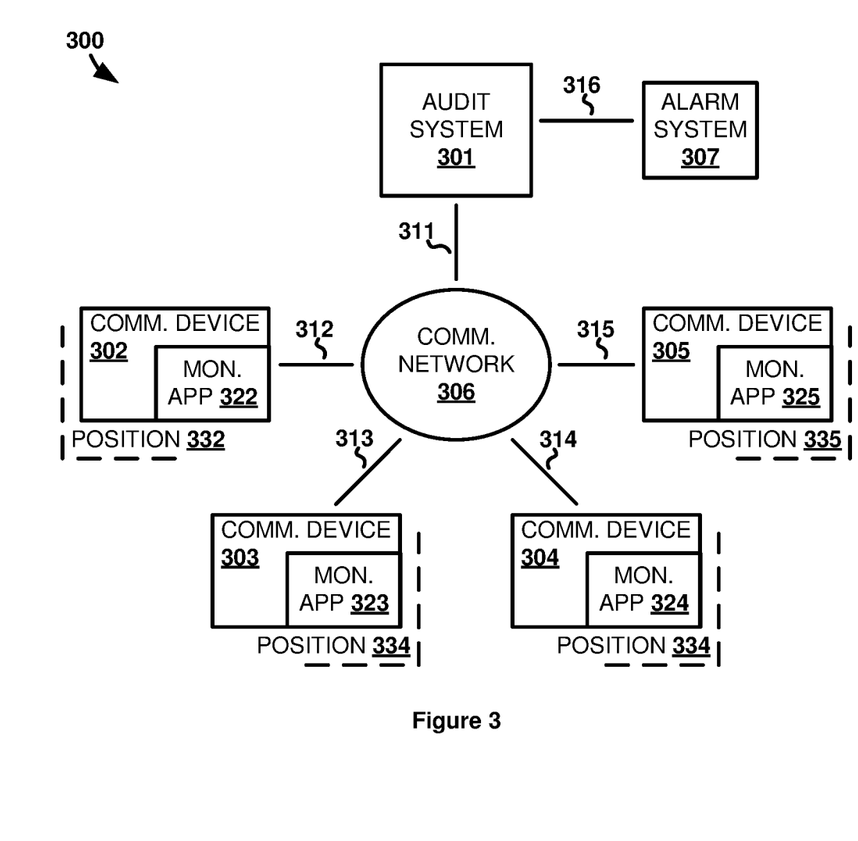
FIG. 3 illustrates another alarm environment for probing alarm functionality at a premises.

FIG. 3 illustrates alarm environment 300 for probing alarm functionality at a premises. Alarm environment 300 includes alarm audit system 301, communication device 302, communication device 303, communication device 304, communication device 305, communication network 306, and alarm system 307. Alarm audit system 301 and communication network 306 communicate over communication link 311. Communication devices 302-305 and communication network 306 communicate over communication links 313-315, respectively. Alarm audit system 301 and alarm system 307 communicate over communication link 316. While shown in more direct communication, alarm audit system 301 and alarm system 307 may communicate through communication network 306.

In operation, alarm system 307 controls an audible alarm within a premises. Alarm system 307 may communicate with various sensors (e.g. smoke detectors, carbon monoxide detectors, chemical detector, manual alarm actuator, and/or other type of sensors) and sound producing elements (e.g. speakers, horns, bells, and/or other type of component for generating an alarm sound) to control whether an audible alarm is to be sounded. Alarm audit system 301 uses communication devices 302-305 to probe whether the audible alarm of alarm system 307 is functioning properly when activated. Specifically, communication devices 302-305 in this example communicate with alarm audit system 301 under the instruction of alarm monitor applications 322-325, respectively. Alarm monitor applications 322-325 may be installed on communication devices 302-305 by alarm audit system 301, by instruction of an administrator of alarm audit system 301, by instruction of a user of each communication device, via an application store for the communication device, or in some other manner—including combinations thereof. In one example, at least a portion of communication devices 302-305 may be owned by an entity operating at the premises or may otherwise be associated with the entity (e.g. employees of the entity) and that association requires that an alarm monitor application be installed on communication devices 302-305. Of course, other reasons for alarm monitor applications 322-325 may also exist.

Figure 4:
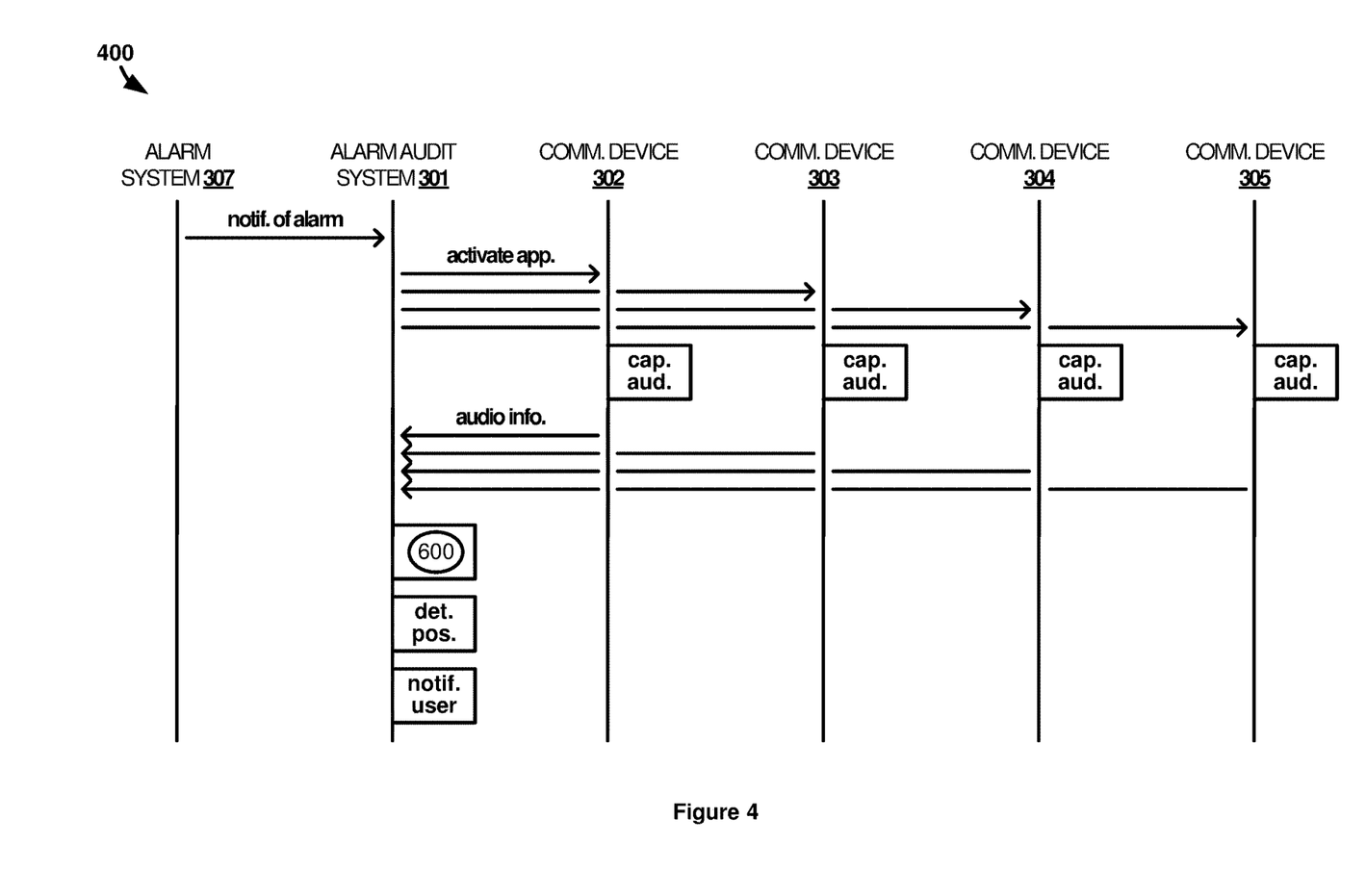
FIG. 4 illustrates a scenario for operating in the other alarm environment to probe alarm functionality at a premises.

FIG. 4 illustrates scenario 400 for operating in the other alarm environment to probe alarm functionality at a premises. In scenario 400, alarm audit system 301 receives a notification from alarm system 307 indicating that an audible alarm has been triggered. The audible alarm may have been triggered in response to a condition detected by alarm system 307 (e.g. fire) or alarm system 307 may have triggered the audible alarm to test the audible alarm. In response to the notification that the audible alarm has been triggered, alarm monitor system 301 transfers a notification to each of communication devices 302-305 instructing alarm monitor applications 422-425 to activate and begin monitoring for an audible alarm. The notifications may be sent individually to each communication device or a single notification may be broadcasted or multicasted over communication network 306 to all devices having an alarm monitor application.

Upon receiving the notification from alarm audit system 301, alarm monitor applications 322-325 begin instructing their respective communication devices 302-305 to capture audio information at their respective positions 332-335 in the premises. In this example, alarm monitor applications 322-325 instruct communication devices 302-305 to transfer the captured audio information to alarm audit system 301. The audio information may be streamed in real-time to alarm audit system 301 or may be transferred in blocks of time. Alarm audit system 301 then performs method 600, described below, to process the audio information from each of communication devices 302-305.

Figure 6:
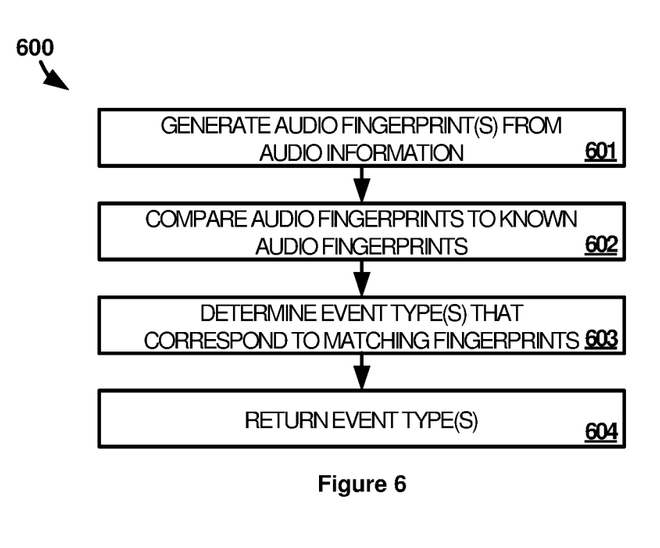
FIG. 6 illustrates a method of operating in the other alarm environment to probe alarm functionality at a premises.

FIG. 6 illustrates method 600 of operating in the other alarm environment to probe alarm functionality at a premises. Within the context of scenario 400, method 600 provides alarm audit system 301 generating an audio fingerprint for audio information from each of communication devices 302-305 (601). An audio fingerprint, as it is known in the art, is effectively a condensed digital summary of the audio information created from processing the audio information using an audio fingerprinting algorithm.

Method 600 then provides alarm audit system 301 comparing the generated fingerprints to one or more known audio fingerprints that maybe stored in alarm audit system 301 or in a storage system accessible from alarm audit system 301 (602). The known fingerprints contain at least a fingerprint representing the sound produced by the audible alarm but may also include fingerprints of sounds produced by other events (e.g. gunshot(s), shouting, water flowing, or some other type of event that may produce sound). Accordingly, method 600 provides alarm audit system 301 determining the event type, or types, that correspond to any of the fingerprints that match the known fingerprints (603). For example, if a known fingerprint representing the alarm sound does not match a fingerprint of audio information from communication device 304, then alarm audit system 301 determines that the alarm is not functioning properly at communication device 304's position since communication device 304 did not capture the alarm sound in its audio information. In another example, a known fingerprint representing the sound of a gunshot may match a fingerprint of audio information from communication device 303. Alarm audit system 301 therefore determines that a gunshot event occurred at the position of communication device 303.

Method 600 then returns the event types, if any, that were found in the audio information from communication devices 302-305 (604). As noted above, the event types may include the audible alarm not functioning, gunshots, fire, shouting, etc. Additionally, along with the event types, method 600 returns the communication device of communication devices 302-305 that captured the audio information from which each event type was identified.

Referring back to scenario 400, once alarm audit system 301 is aware of any event types that were identified, alarm audit system 301 determines the positions of the communication device that captured the audio information of each event. The position may be determined from information received from communication devices 302-305 or alarm audit system 301 may use other means to determine device positions. For example, continuing the examples from above, method 600 may return that the alarm is not functioning properly at communication device 304 and a gunshot occurred at communication device 303. Accordingly, alarm audit system 301 determines that communication device 304 is located at position 334 where the alarm is not functioning properly and communication device 303 is located at position 333 where the gunshot occurred. Once the positions have been determined, alarm audit system 301 provides notifications to a user indicating the events and where each event occurs. The notification may be produced at a user interface of alarm audit system 301 or a notification may be sent to another system where the information can be presented to a user. Again using the example from above, alarm audit system 301 will notify a user that the alarm is not functioning properly at position 334 and a gunshot occurred at position 333 so that the user can take action to address those events.

In some examples, alarm audit system 301 may further notify of positions at the premises where it is known that the audible alarm is functioning properly based on the determinations of method 600. In this manner, alarm audit system 301 is able to provide an overall "picture" of the alarm functionality on the premises during the audible alarm.

Figure 5:
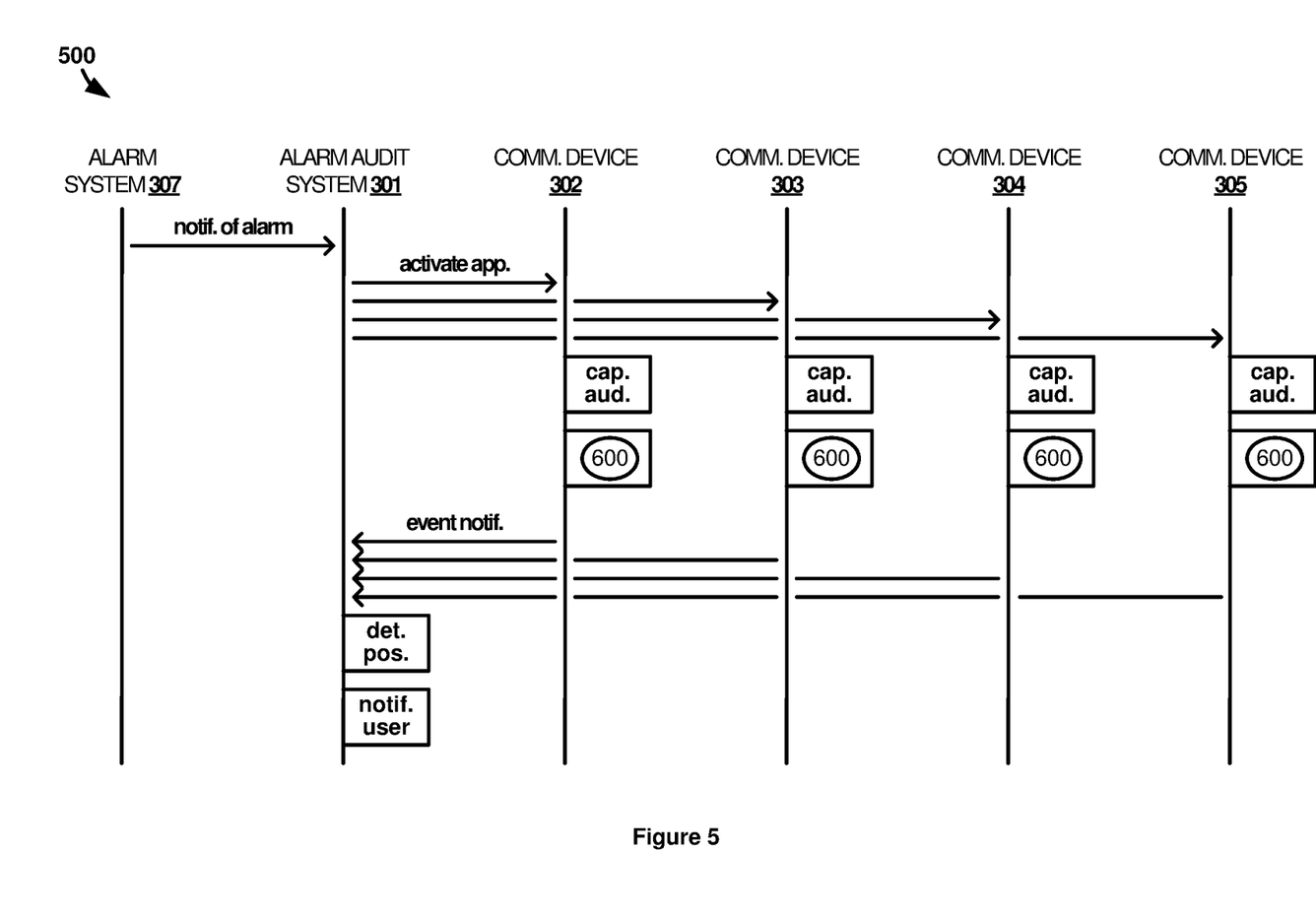
FIG. 5 illustrates another scenario for operating in the other alarm environment to probe alarm functionality at a premises.

FIG. 5 illustrates scenario 500 for operating in the other alarm environment to probe alarm functionality at a premises. Scenario 500 begins very similarly to scenario 400 with alarm audit system 301 receiving an indication that an audible alarm has been triggered and transferring a notification to communication devices 302-305 instructing alarm monitor applications 322-325 to activate. In response to the activation instruction, alarm monitor applications 322-325 instruct their respective communication devices to capture audio information.

Unlike scenario 400, in the example of scenario 500, audio monitor applications 322-325 further instruct communication devices 302-305 to perform method 600 on their own captured audio information. Consequently, instead of having to transfer audio information to alarm audit system 301, communication devices 302-305 merely transfer notifications of whether event types were identified from the audio information. Using the same examples from above, communication device 304 would transfer a notification that the alarm is not functioning properly at its position and communication device 303 would transfer a notification that a gunshot sounded at its location. Communication devices that do not identify an event or do not determine that the audible alarm is malfunctioning may send a notification as well indicating such facts or alarm audit system 301 may be configured to assume those facts if no notification is received.

Upon being notified of the events, alarm audit system 301 determines the positions of communication devices 303 and 304 and notifies a user of the events at those positions like it did in scenario 400. Thus, in scenario 500, the processing needed to identify the event types, including whether the audible alarm is functioning properly, is performed by the individual communication devices rather than by alarm audit system 301 itself, as was the case in scenario 400. It should be understood that the processing duties may be split in other ways between alarm audit system 301 and communication devices 302-305 than those described with respect to scenarios 400 and 500. For example, different communication device types may prevent certain device types from performing the audio information processing locally (e.g. may lack the capability to support a fully functioning alarm monitor application, if any application at all) and, therefore, those devices may transfer the audio information to alarm audit system 301 for processing while other device types process audio information locally.

In some examples, regardless of which element performs method 600, method 600 may be repeated one or more times or may run continually until otherwise instructed to stop (e.g. when the audible alarm is no longer triggered). Likewise, the positions of mobile devices of communication devices 302-305 may be determined at additional times to track the movement of those mobile devices. Continuing to perform method 600 and/or determining mobile device positions may allow alarm audit system 307 to track additional positions where the alarm is not functioning properly and/or where additional event types are detected by the devices. Moreover, in some cases, mobile devices that are not moving may indicate that people in a certain area of the premises are somehow unable to move (e.g. blocked by an obstruction). Alarm audit system 301 could therefore notify a user to send help to that area of the premises.

Figure 7:
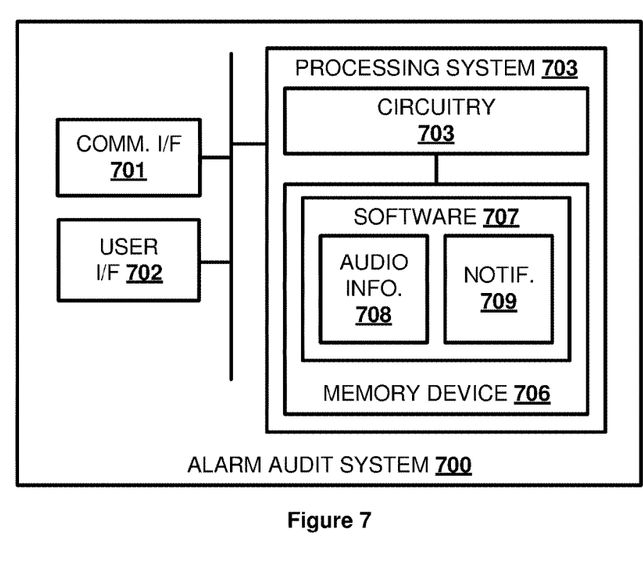
FIG. 7 illustrates a computing architecture for implementing an alarm audit system to probe alarm functionality at a premises.

FIG. 7 illustrates alarm audit system 700. Alarm audit system 700 is an example of alarm audit system 101, although system 101 may use alternative configurations. A similar computing architecture may also be used for the communication devices disclosed herein. Alarm audit system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes audio information module 708 and notification module 709. Operating software 707 may further include an operating system, utilities, drivers, network interfaces, applications, or some other type of software. When executed by circuitry 705, operating software 707 directs processing system 703 to operate alarm audit system 700 as described herein.

In particular, audio information module 708 directs processing system 703 to, in response to activation of an audible alarm, obtain audio information captured by a first communication device of a plurality of communication devices positioned throughout a premises and determine whether the audio information indicates that the alarm is functioning properly. Notification module 709 directs processing system 703 to determine a first position of the premises where the first communication device is located and, when the audio information indicates that the alarm is not functioning properly, indicate that the alarm is not functioning properly at the first position.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for probing alarm functionality at a premises, the method comprising:
in response to activation of an audible alarm, obtaining audio information captured by a first communication device of a plurality of communication devices positioned throughout the premises;
determining whether the audio information indicates that the alarm is functioning properly;
determining a first position of the premises where the first communication device is located; and when the audio information indicates that the alarm is not functioning properly, indicating that the alarm is not functioning properly at the first position.

2. The method of claim 1, further comprising:
in response to the activation of the audible alarm, obtaining audio information from each of the plurality of communication devices;
determining whether the audio information from each of the plurality of communication devices indicates that the alarm is functioning properly;
for devices of the plurality of communication devices with audio information that indicates that the alarm is not functioning properly, determining respective positions of the premises where the devices are located; and
indicating that the alarm is not functioning properly at the positions.

3. The method of claim 2, wherein obtaining the audio information comprises:
receiving an indication that the audible alarm has been triggered from an alarm system; and
instructing the plurality of communication devices to activate an alarm monitor application to capture the audio information.

4. The method of claim 1, wherein the first communication device comprises a mobile communication device and the method further comprising:
determining whether the first position changes to identify whether the first communication device is moving.

5. The method of claim 4, further comprising:
when the first communication device is not moving, providing a user notification that people may be having problems at the first location.

6. The method of claim 1, wherein determining whether the audio information indicates that the alarm is functioning properly comprises:
comparing the audio information to an audio fingerprint of the audible alarm, wherein the alarm is functioning properly when the audio information corresponds with the audio fingerprint.

7. The method of claim 1, further comprising:
determining whether at least a portion of the audio information corresponds to an audio fingerprint for a type of event;
indicating that the type of event is occurring when the audio information corresponds to the audio fingerprint.

8. The method of claim 1, wherein indicating that the alarm is not functioning properly at the first position comprises:
providing a notification to a user indicating that the alarm is not functioning properly at the first position.

9. The method of claim 1, wherein determining the first position comprises:
determining a network location of the first communication device; and
identifying a position of the premises corresponding to the network location as the first position.

10. The method of claim 1, wherein indicating that the alarm is not functioning properly at the first position occurs after a predetermined period of time.

11. An alarm audit system for probing alarm functionality at a premises, the alarm audit system comprising:
one or more computer readable storage media;
a processing system operatively coupled with the one or more computer readable storage media; and
program instructions stored on the one or more computer readable storage media that, when read and executed by the processing system, direct the processing system to:
in response to activation of an audible alarm, obtain audio information captured by a first communication device of a plurality of communication devices positioned throughout the premises;
determine whether the audio information indicates that the alarm is functioning properly;
determine a first position of the premises where the first communication device is located; and
when the audio information indicates that the alarm is not functioning properly, indicate that the alarm is not functioning properly at the first position.

12. The alarm audit system of claim 11, wherein the program instructions further direct the processing system to:
in response to the activation of the audible alarm, obtain audio information from each of the plurality of communication devices;
determine whether the audio information from each of the plurality of communication devices indicates that the alarm is functioning properly;
for devices of the plurality of communication devices with audio information that indicates that the alarm is not functioning properly, determine respective positions of the premises where the devices are located; and
indicate that the alarm is not functioning properly at the positions.

13. The alarm audit system of claim 12, wherein to obtain the audio information, the program instructions direct the processing system to at least:
receive an indication that the audible alarm has been triggered from an alarm system; and
instruct the plurality of communication devices to activate an alarm monitor application to capture the audio information.

14. The alarm audit system of claim 11, wherein the first communication device comprises a mobile communication device and wherein the program instructions further direct the processing system to:
determine whether the first position changes to identify whether the first communication device is moving.

15. The alarm audit system of claim 14, wherein the program instructions further direct the processing system to:
when the first communication device is not moving, provide a user notification that people may be having problems at the the first location.

16. The alarm audit system of claim 11, wherein to determine whether the audio information indicates that the alarm is functioning properly, the program instructions direct the processing system to at least:
compare the audio information to an audio fingerprint of the audible alarm, wherein the alarm is functioning properly when the audio information corresponds with the audio fingerprint.

17. The alarm audit system of claim 11, wherein the program instructions further direct the processing system to:
determine whether at least a portion of the audio information corresponds to an audio fingerprint for a type of event;
indicate that the type of event is occurring when the audio information corresponds to the audio fingerprint.

18. The alarm audit system of claim 11, wherein to indicate that the alarm is not functioning properly at the first position, the program instructions direct the processing system to at least:
provide a notification to a user indicating that the alarm is not functioning properly at the first position.

19. The alarm audit system of claim 11, wherein to determine the first position, the program instructions to direct the processing system to at least:
  determine a network location of the first communication device; and
  identify a position of the premises corresponding to the network location as the first position.

20. A communication device for probing alarm functionality at a premises, wherein the communication device comprises one of a plurality of communication devices positioned throughout the premises, the communication device comprising:
  one or more computer readable storage media;
  a processing system operatively coupled with the one or more computer readable storage media; and
  program instructions stored on the one or more computer readable storage media that, when read and executed by the processing system, direct the processing system to:
  in response to activation of an audible alarm, capture audio information;
  determine whether the audio information indicates that the alarm is functioning properly;
  determine a first position of the premises where the communication device is located; and
  when the audio information indicates that the alarm is not functioning properly, indicate that the alarm is not functioning properly at the first position.

* * * * *